United States Patent [19]
Abbott

[11] 3,771,541
[45] Nov. 13, 1973

[54] HIGH GAIN ELECTROHYDRAULIC SERVO VALVE

[75] Inventor: Roderick K. Abbott, Valencia, Calif.

[73] Assignee: The Bendix Corporation, North Hollywood, Calif.

[22] Filed: Apr. 30, 1971

[21] Appl. No.: 139,097

[52] U.S. Cl. .................................... 137/85, 137/118
[51] Int. Cl. ............................................. G05d 16/00
[58] Field of Search ..................... 137/82, 84, 118, 137/119, 625.62, 625.64

[56] References Cited
UNITED STATES PATENTS

| | | | |
|---|---|---|---|
| 3,536,087 | 10/1970 | Allen | 137/82 |
| 3,095,002 | 6/1963 | Healy | 137/625.64 X |
| 3,426,784 | 2/1969 | Vick | 137/82 X |
| 3,043,326 | 7/1962 | Fatreille | 137/118 X |

*Primary Examiner*—Alan Cohan
*Attorney*—Robert Smith and Plante, Hartz, Smith and Thompson

[57] ABSTRACT

An electrohydraulic servo valve design is described having a pair of parallel-directed nozzles connected through conduits to a source of operating fluid under pressure with a load piston connected to the conduits such that its ends communicate with the pressure immediately upstream of the nozzles. A torque motor operates a flapper valve to restrict one nozzle and reduce the restriction of the other to vary the conduit pressure to create a control pressure differential across the load piston. Connected between each of the conduits and the fluid pressure source is a pair of orifices with a reed valve positioned therebetween and supported such that it responds to the control pressure differential to further restrict one of the pair of orifices while reducing the restriction of the other. In this manner, pressure in one conduit having the higher pressure is communicated to the reed valve which moves away from its corresponding orifice to permit the pressure in that one conduit to increase to a value even closer to the supply pressure than before. At the same time the pressure in the other conduit which was reduced is further reduced as the reed valve further restricts the area of its corresponding orifice. Thus, for a servo valve of a given size, the described pair of orifices and adjacent reed valve operate to substantially increase the pressure differential across the load for a given displacement of the flapper valve near null position.

4 Claims, 6 Drawing Figures

Patented Nov. 13, 1973
3,771,541
2 Sheets-Sheet 1
Fig_1A
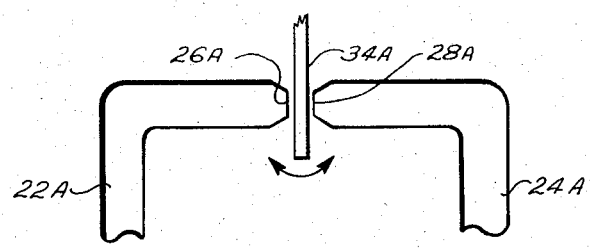
Fig_1
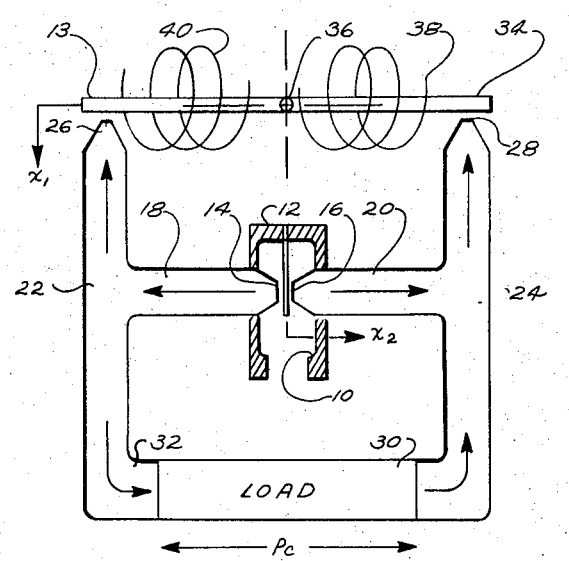
INVENTOR.
RODERICK K. ABBOTT
BY
Robert Smith
ATTORNEY

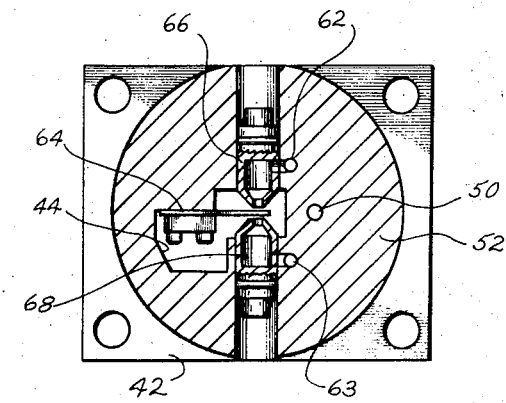
FIG_4
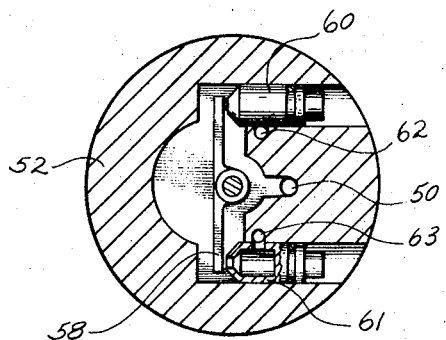
FIG_5
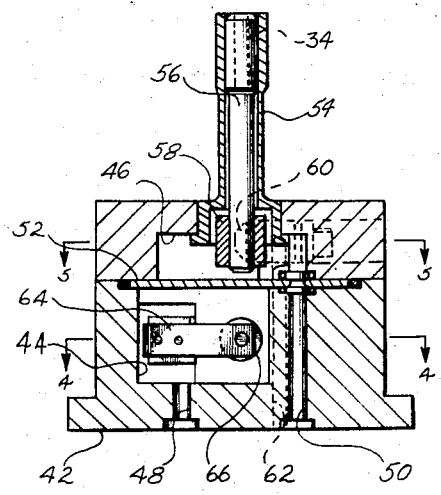
FIG_3
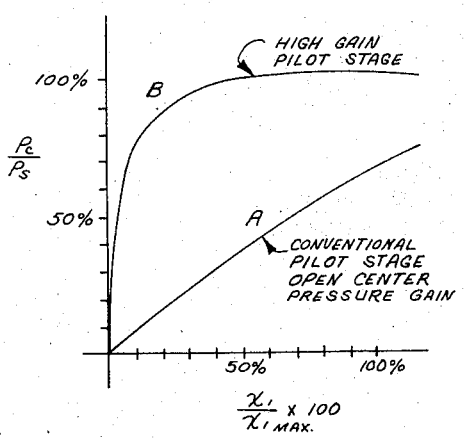
FIG_2

HIGH GAIN ELECTROHYDRAULIC SERVO VALVE

BACKGROUND OF THE INVENTION

Electrohydraulic servo valves are well known in the art, having been in substantial use for many years. The typical such servo motor device consists of a pair of nozzles which are connected through fixed restrictions to a source of fluid under pressure and a flapper member movable by means of a torque motor to increase the effective restriction of one nozzle and decrease the restriction of the other. Because of problems with dirt and other contamination restricting the nozzles and causing malfunction, a design has been provided in which the nozzles are directed in an essentially parallel flow against an elongated baffle which is driven by the torque motor such that the baffle pivots around its center, thereby moving in a direction toward closing one nozzle and further opening the other. The baffle member itself is mounted on flexible means which permits the entire baffle to move in the same direction away from the nozzles in response to pressure increases resulting from obstructions in the nozzles or between the nozzles and the baffle.

Electrohydraulic servo valves are normally quite reliable and may be made to have very linear operating characteristics. One difficulty which has been found, however, is that once a servo valve is designed to a given size or capacity, it is quite difficult, without a major redesign involving substantially increasing the size of the components, to substantially increase its gain or amplification factor.

CROSS-REFERENCES TO RELATED APPLICATIONS

Donald V. Healy U.S. Pat. Nos. 2,823,689 and 3,095,002.

SUMMARY OF THE INVENTION

In an electrohydraulic servo valve of the type shown in either of the above referenced patents, the usual fixed restrictions are replaced by a pair of opposing orifices connected between the fluid pressure source and the principal control nozzles, and a flexible reed is supported in the housing between the orifices in such manner that it provides a limited and equally imposed restriction on each of the orifices in the absence of an electrical input signal to the torque motor. Energizing of the torque motor causes one of the nozzles to be restricted to a greater extent than the other with a resulting increase in the pressure upstream of the restricted nozzle and a decrease in the pressure upstream of the nozzle whose restriction has been decreased. This pressure differential is then sensed across the flexible reed which moves in a direction to further restrict the flow of pressure fluid to the orifice communicating with the lower pressure and to increase the flow of high pressure fluid through the office already sensing the increased pressure. As a result, the pressure differential across the load becomes substantially greater for a given input from the torque motor than would be the case of the auxiliary orifices and flexible reed were not included.

BRIEF DESCRIPTION OF THE DRAWINGS

FIG. 1 is a schematic drawing of a fluid circuit typical of servo valves of the type having a parallel nozzle arrangement and with the auxiliary orifices and flexible reed connected between the nozzles and the pressure source.

FIG. 1A is a schematic drawing of a modified form of servo valve using opposed control nozzles instead of the parallel-directed nozzles.

FIG. 2 is a graph showing the relative load pressure v. displacement characerics as compared with applicant's high gain servo valve.

FIG. 3 is a sectional view of a portion of a servo valve with the torque motor omitted, but showing applicant's auxiliary orifice and reed arrangement.

FIG. 4 is a sectional view of the servo valve of FIG. 3 taken along lines 4—4 of FIG. 3.

FIG. 5 is a sectional view of the servo valve of FIG. 3 taken along lines 5—5 of FIG. 3.

DESCRIPTION OF THE PREFERRED EMBODIMENT

FIG. 1 is a schematic diagram of the fluid circuit of a servo valve according to my invention. Fluid under pressure, $P_s$, is supplied from a source (not shown) to an inlet chamber 10 from whence it flows across both sides of a flexible reed member 12 which partially obscures orifices 14 and 16. From orifices 14 and 16 the fluid pressure flows into branch passages 18 and 20, respectively, to the respective main conduits 22 and 24 which commmunicate with the control nozzles 26 and 28, respectively. The fluid pressure in conduits 22 and 24 is communicated to opposite sides of a load piston 30 movable in a cylinder 32. The pivotable baffle member 34, which may be the same member mechanically as the torque motor armature or driven by the armature, is movable around a pivot 36 in response to energizing of windings 38 or 40. The torque motor is not shown, since this structure is old and well understood. It normally includes magnetic members positioned adjacent the armature such that when the windings are energized the baffle 34 is moved to restrict nozzle 26 and to relieve nozzle 28 or vice versa, depending upon the polarity of the input signal. Rotation of the baffle 34 toward the nozzle 26 results in increasing the pressure in conduit 22 and decreasing the pressure in conduit 24, thereby creating a pressure differential across the load piston 30 which would tend to move piston 30 toward the right. The increase in pressure in conduit 22 will also be sensed in conduit 18 and at orifice 14, and a corresponding reduction in conduits 24 and 20 and orifice 16. The result of this differential is to cause the flexible reed member 12 to be moved toward further obstruction of orifice 16 and further opening of orifice 18, thereby raising the pressure in conduits 18 and 22 closer to the supply pressure in chamber 10. A corresponding reduction will occur in the pressure in conduit 24 and branch conduit 20. Thus it will be appreciated that the movable reed member 12 and the associated orifices 14 and 16 operate to significantly augment the gain of the system.

FIG. 1a shows a partial schematic arrangement which represents a servo valve essentially like that of FIG. 1 but with a slightly different arrangement for the main control nozzles. In this arrangement, the main control nozzles 26a and 28a do not operate in parallel but are formed to oppose each other, with each directing a stream against a baffle or flapper member 34a which is movable by the torque motor as described. With this arrangement, when the torque motor moves the flapper member 34a closer to nozzle 28a, pressure will be increased upstream of nozzle 28a and in conduit 24a and correspondingly decreased upstream of nozzle 26a and in conduit 22a. The variable upstream orifices 14 and 16 and the operation of the flexible reed member 12 operate in this configuration in the same manner as that described.

This gain relationship is shown in the graph of FIG. 2 wherein the normalized load pressure $P_c/P_s$ is plotted against normalized displacement $X_1/X_{1\ max}$. In this graph, curve A shows the relatively linear characteristic of a conventional single-stage electrohydraulic servo valve. This is the characteristic which would normally be expected from a servo valve of the type shown in the above-noted Healy U.S. Pat. No. 3,095,002. Because of the regenerative feedback effect of the auxiliary orifices 14 and 16 and control by the reed member 12, the system shown in FIG. 1 develops a very high gain with very limited displacement of the baffle member 34 to approximately 50 percent of its displacement, after which the gain increases very little with further displacement increase. This arrangement does, however, result in a very substantial increase in gain for a servo valve of a given size.

FIG. 3 is a sectional view, as seen from the side, of a portion of a servo valve showing the general arrangement of mechanical parts involved in my servo valve. The torque motor structure itself has been omitted since it is conventional and described in detail in the patents referred to above. A housing 42 contains an inlet or supply pressure chamber 44 and a return chamber 46. Operating fluid at supply pressure is supplied to chamber 44 through an inlet conduit 48, and the return pressure chamber 46 is communicated with the return side of the pressure source through a conduit 50. The chambers 42 and 46 are separated by means of a plate 52. The torque motor, not shown, is physically positioned above the housing 42 and operates to provide limited movement of the armature 34, which is fastened to the torque tube 54 and also to an internal shaft 56 which pivots the baffle member 58 relative to the position of the nozzles. In FIG. 3 a single nozzle member 60 is shown in dotted outline. Connected to nozzle member 60 is a conduit 62 which communicates with a load device, not shown. Positioned within the chamber 44 is a flexible reed member 64 which is movable relative to an orifice 66.

Referring to FIG. 4, which is a sectional view of the device of FIG. 3 taken on line 4—4 of FIG. 3, the housing is shown at numeral 42, and the dividing plate 52 is supported in the housing as shown. A pair of orifice members 66 and 68 are so located in chamber 44 that they are directed in opposition to each other and in close proximity to the flexible reed member 64. Flow entering the orifice members 66 and 68 communicates with conduits 62 and 63, respectively, which, it will be seen in FIG. 5, also communicates with the main nozzles 60 and 61 which are controlled by means of the baffle member 58.

Operation of the device shown in FIGS. 3, 4 and 5 is essentially the same as that described with respect to FIG. 1. Fluid under pressure is supplied through conduit 48 to the chamber 44 from whence it flows past the flexible reed 64 equally into orifice members 66 and 68, through passageways 62 and 63 to nozzles 60 and 61, where it flows out past the baffle member 58 and into the return conduit 50 from whence it is returned to the fluid supply source. With no signal on the torque motor, the baffle 58 will remain equally spaced from nozzle members 60 and 61 as shown in FIG. 5, and the pressure communicated through conduits 62 and 63 to the load will be equal. Movement of the armature member 34 as a result of energizing the torque motor will result in moving the baffle member 58 around its pivot making one end, for example, closer to nozzle 61. This will result in an increase in the pressure in conduit 63 and a reduction in the pressure in conduit 62, and this will be communicated to the interior of orifice members 68 and 66 in like manner. The increased pressure in orifice 68 will result in moving the reed member 64 toward orifice member 66, causing a further reduction in the pressure within orifice member 66 and conduit 62 and permitting the supply pressure to be communicated to the interior of member 68 with even less restriction than before, thereby further raising the pressure operating in conduit 63. Thus the load device, which may be like that shown in FIG. 1, will see a substantially increased pressure differential between conduits 62 and 63 and will be caused to move accordingly.

While only a limited number of embodiments have been shown and described herein, those skilled in the art will recognize that the principle taught herein is applicable to servo valves of varying configurations. As an example, there are many feedback arrangements utilized in connection with servo valves, and none of these have been dealt with herein. Other configurations may vary somewhat the arrangement of the baffle or "flapper" and the main control nozzles, and while the reed valve arrangement shown herein is quite simple and straightforward, other valve arrangements responsive to the control pressure differential may be useful for particular applications.

I claim:

1. A servo valve comprising:

a hydraulic housing;

a flow control system within said housing including a pair of nozzles and a baffle positioned to vary the flow of fluid from respective nozzles, and first and second conduits connecting said nozzles with a load means and with a source of fluid under pressure;

motor means in said housing and means for transmitting torque from said motor means to said baffle to vary the relative spacing of said baffle with respect to said nozzles in proportion to the torque from said motor simultaneously in the opposite sense;

characterized in that first and second branch conduits are connected between said source and said first and second conduits, first and second orifices are positioned in said first and second branch conduits, and spring-centered valve means is operatively connected to said orifices and to said first and second conduits such that is responds to pressure differentials between said first and second conduits to further restrict one of said orifices and to reduce the restriction in the other orifice to further increase said pressure differentials for a given spacing of said baffle.

2. A servo valve as set forth in claim 1 wherein said nozzles are substantially parallel directed, said baffle includes spaced portions positioned to vary the flow from said nozzles, and said motor means, when energized, acts to vary the relative spacing of said baffle spaced portions to vary the flow from said nozzles.

3. A servo valve comprising:

a hydraulic housing;

a flow control system within said housing including a pair of substantially parallel directed nozzles and an elongated baffle having spaced portions positioned to vary the flow of fluid from respective nozzles, first and second conduits connected to said nozzles and to a load means, first and second branching conduits connected to said first and second conduits and to a source of fluid under pressure, first and second opposing orifices in said branching conduits in close proximity to each other, a flexible reed supported in said housing and normally centered between said orifices such that it partially restricts each orifice and responds to pressure differentials in said branch conduits to move in a direction to further restrict one of said orifices and to reduce the restriction in the other orifice to further increase said pressure differentials for a given spacing of said baffle, a motor compartment and motor means in the compartment, means sealing said hydraulic housing from said motor compartment;

said sealing means comprising a nonrigid tube with one end sealed to said hydraulic housing and a shaft sealing the free end of said tube and extending through said tube;

said shaft coupled to a point midway between the said spaced portions to transmit torque from said motor means to said baffle to vary the relative spacing of said baffle spaced portions with respect to said nozzles simultaneously in opposite sense;

said tube and shaft supporting said baffle for simultaneous translation movement in the same sense toward and away from said nozzles in response to fluid pressure changes thereat.

4. In an electrohydraulic servo valve, a coil for receiving electric signals, an armature consisting of a thin plate in close proximity to said coil for proportional movement in response to a signal in said coil, a pair of fluid discharge nozzles terminating in close proximity to said armature at opposite ends of said coil and acting on the same face of said armature, said armature when magnetized by a signal in said coil swinging toward one of said nozzles and away from the other nozzle, first and second conduits connected to said nozzles and to load means, first and second branching conduits connected to said first and second conduits and to a source of fluid under pressure, first and second opposing orifices in each of said branching conduits in close proximity to each other, and a normally centered flexible reed supported between said orifices such that it partially restricts each orifice and responds to pressure differentials in said branch conduits to move in a direction to further restrict one of said orifices and to reduce the restriction in the other orifice to further increase said pressure differentials for a given spacing of said armature from said nozzles.

* * * * *